(12) United States Patent
Henry et al.

(10) Patent No.: US 12,481,646 B2
(45) Date of Patent: *Nov. 25, 2025

(54) REAL-TIME PROCESSING REQUEST LOCATION SYSTEM

(71) Applicant: Truist Bank, Charlotte, NC (US)

(72) Inventors: Kendra Henry, Charlotte, NC (US); Luana Peterman, Lancaster, SC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,658

(22) Filed: Jun. 28, 2024

(65) Prior Publication Data

US 2025/0045272 A1   Feb. 6, 2025

Related U.S. Application Data

(63) Continuation of application No. 18/364,658, filed on Aug. 3, 2023, now Pat. No. 12,050,595.

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 2012/0023193 A1* | 1/2012 | Eisner | G06Q 30/00 709/217 |
| 2014/0039990 A1* | 2/2014 | Georgi | G06Q 30/0229 705/14.3 |
| 2014/0207682 A1* | 7/2014 | Wolfond | G06Q 20/12 705/44 |
| 2015/0356690 A1* | 12/2015 | Celikyilmaz | G06Q 40/12 705/30 |
| 2016/0307197 A1* | 10/2016 | Roeill | G06Q 40/04 |
| 2019/0392489 A1* | 12/2019 | Tietzen | G06Q 20/387 |
| 2020/0382955 A1* | 12/2020 | Shenker | G06Q 20/326 |
| 2022/0012711 A1* | 1/2022 | Oosthuizen | H04L 9/3226 |
| 2022/0075825 A1* | 3/2022 | Helms | H04L 9/3234 |
| 2022/0374898 A1* | 11/2022 | Kaitha | G06Q 20/405 |
| 2022/0405740 A1* | 12/2022 | Graylin | G06Q 20/385 |
| 2024/0037556 A1* | 2/2024 | Amrutiya | G06Q 20/4014 |
| 2024/0354718 A1* | 10/2024 | Zhang | G06Q 20/401 |

\* cited by examiner

*Primary Examiner* — Irene Baker
(74) *Attorney, Agent, or Firm* — Kilpatrick Townsend & Stockton LLP (57) ABSTRACT

A real-time transaction location system for quickly and conveniently locating an electronic transaction within a transaction processing system in real time. The real-time transaction location system includes a transaction location tool that is communicatively coupled to the transaction processing system. The transaction location tool can assign a unique search identifier to an electronic transaction received by the transaction processing system based on a received transaction identifier and an application identifier that identifies a processing application of the transaction processing system that is selected based on the format of an electronic message conveying the electronic transaction. The transaction location tool may include a user interface that facilitates real-time location of an electronic transaction within the transaction processing system using the unique search identifier.

20 Claims, 4 Drawing Sheets

REAL-TIME PROCESSING REQUEST LOCATION SYSTEM

CROSS-REFERENCE TO RELATED APPLICATIONS

This application is a continuation of U.S. application Ser. No. 18/364,658, filed Aug. 3, 2023, titled REAL-TIME PROCESSING REQUEST LOCATION SYSTEM, the entirety of which is incorporated herein by reference.

TECHNICAL FIELD

The present disclosure relates generally to request processing systems, and more particularly, although not exclusively, to a tool for conserving memory, processor, and user resources by enabling the real-time location of an electronic processing request within a request processing system.

BACKGROUND

An electronic processing request can be conveyed through an electronic message, which may also provide various details about the electronic processing request. Executing an electronic processing request may also require additional information gathering, as well as various other identification, authorization, or validation operations. Executing an electronic processing request may further involve entities other than an entity in receipt of the processing request, as well as information regarding individuals associated with the electronic processing request.

Different types of electronic processing requests can be conveyed through electronic messaging. According to an example of the present disclosure, an electronic processing request may be a request to process an electronic transaction.

SUMMARY

According to one example of the present disclosure, a real-time transaction location system may include a transaction processing system having a channels layer configured to receive electronic messages transmitted via a plurality of different initiating channels, a message orchestration layer configured to receive the electronic messages from the channels layer and to queue the electronic messages for downstream transmission, and a transaction processing layer configured to receive the electronic messages from the message orchestration layer and to process, by one or more of multiple transaction servers, electronic transactions contained in the electronic messages. The real-time transaction location system may also include a transaction location tool, which may comprise a processor communicatively coupled to the transaction processing system, a user interface communicatively coupled to the processor and facilitating the input of search requests to locate electronic transactions within the transaction processing system, and a memory communicatively coupled to the processor, the memory including instructions that are executable by the processor to cause the processor to perform operations. The operations may include receiving from the transaction processing system, an indication that the transaction processing system has received from an initiating channel of the plurality of different initiating channels, an electronic message conveying a request to process an electronic transaction, the electronic message having a plurality of data fields containing various electronic transaction information, at least one data field of the plurality of data fields including a transaction identifier. The operations may also include obtaining from the transaction processing system, a format of the electronic message, the transaction identifier, and other electronic transaction information contained in other data fields of the plurality of data fields of the electronic message. The operations may additionally include creating a unique search identifier by associating the transaction identifier with an application identifier that identifies a transaction processing application operating on at least one of the multiple transaction servers of the transaction processing system, the transaction processing application selected based on the format of the electronic message. The operations may further include associating the other electronic transaction information with the unique search identifier, assigning the unique search identifier to the electronic transaction, and associating the unique search identifier with the electronic message. The operations may further include, in response to a search request providing at least some of the other electronic transaction information being input into the user interface, determining the real-time location of the electronic transaction within the transaction processing system by searching the transaction processing system using the unique search identifier.

According to another example of the present disclosure, a non-transitory computer readable medium may contain instructions that are executable by a processor of a transaction location tool for causing the processor to perform operations. The operations may include communicating with a transaction processing system having a channels layer configured to receive electronic messages transmitted via a plurality of different initiating channels, a message orchestration layer configured to receive the electronic messages from the channels layer and to queue the electronic messages for downstream transmission, and a transaction processing layer configured to receive the electronic messages from the message orchestration layer and to process, by one or more of multiple transaction servers, electronic transactions contained in the electronic messages. The operations may also include receiving from the transaction processing system, an indication that the transaction processing system has received from an initiating channel of the plurality of different initiating channels, an electronic message conveying a request to process an electronic transaction, the electronic message having a plurality of data fields containing various electronic transaction information, at least one data field of the plurality of data fields including a transaction identifier. The operations may also include obtaining from the transaction processing system, a format of the electronic message, the transaction identifier, and other electronic transaction information contained in other data fields of the plurality of data fields of the electronic message. The operations may additionally include creating a unique search identifier by associating the transaction identifier with an application identifier that identifies a transaction processing application operating on at least one of the multiple transaction servers of the transaction processing system, the transaction processing application selected based on the format of the electronic message. The operations may further include associating the other electronic transaction information with the unique search identifier, assigning the unique search identifier to the electronic transaction, and associating the unique search identifier with the electronic message. The operations may further include, in response to a search request providing at least some of the other electronic transaction information being input into the user interface, determining the real-time location of the electronic transaction within the transaction processing system by searching the transaction processing system using the unique search identifier.

According to a further example of the present disclosure, a computer-implemented method for the real-time location of an electronic transaction within a transaction processing system may include communicatively coupling a transaction location tool to a transaction processing system including a channels layer configured to receive electronic messages transmitted via a plurality of different initiating channels, a message orchestration layer configured to receive the electronic messages from the channels layer and to queue the electronic messages for downstream transmission, and a transaction processing layer configured to receive the electronic messages from the message orchestration layer and to process, by one or more of multiple transaction servers, electronic transactions contained in the electronic messages. The computer-implemented method may also include receiving, by a processor of the transaction location tool, from the transaction processing system, an indication that the transaction processing system has received from an initiating channel of the plurality of different initiating channels, an electronic message conveying a request to process an electronic transaction, the electronic message having a plurality of data fields containing various electronic transaction information, at least one data field of the plurality of data fields including a transaction identifier. The computer-implemented method may additionally include obtaining, by the processor of the transaction location tool, from the transaction processing system, a format of the electronic message, the transaction identifier, and other electronic transaction information contained in other data fields of the plurality of data fields of the electronic message. The computer-implemented method may further include creating, by the processor of the transaction location tool, a unique search identifier by associating the transaction identifier with an application identifier that identifies a transaction processing application operating on at least one of the multiple transaction servers of the transaction processing system, the transaction processing application selected based on the format of the electronic message. The computer-implemented method may further include, associating, by the processor, the other electronic transaction information with the unique search identifier, assigning, by the processor, the unique search identifier to the electronic transaction, and associating, by the processor, the unique search identifier with the electronic message. The computer-implemented method may further include, in response to a search request providing at least some of the other electronic transaction information being input into a user interface of the transaction location tool, determining, by the processor of the transaction location tool, the real-time location of the electronic transaction within the transaction processing system by searching the transaction processing system using the unique search identifier.

DETAILED DESCRIPTION

An environment for executing electronic processing requests may include a request processing system that receives different types of electronic processing requests. The requests may be transmitted via multiple different initiating channels over a network. The effort required to process a given electronic processing request may depend on the nature of the request, as well as on the complexity of the request processing system of the processing entity that received the request, the required number of communications with other entities, the amount of required information gathering and validation, etc. Many electronic processing request may be executed quickly, while others may require more time (e.g., days) to complete.

In any case, it would be helpful for both internal purposes of the processing entity and for improving the experience of requestors, if a given electronic processing request within a request processing system can be easily located in real time, and can be located without the expenditure of significant user, processor, or memory resources. Unfortunately, known electronic request processing systems do not normally include such functionality.

Aspects of the present disclosure are directed to a real-time processing request location system including a request processing system having a request location tool that communicates with the request processing system and can quickly and conveniently locate electronic processing requests of interest within the request processing system. A given electronic processing request can be a real-time electronic processing request, or an electronic processing request of a plurality of received electronic processing requests that will be executed as a batch.

Although electronic messages conveying different types of electronic processing requests will also have different formats, the electronic processing requests themselves can sometimes have identical request identifiers. Thus, in order to avoid inadvertently locating an incorrect electronic processing request during a searching operation, the request location tool can create a unique search identifier for each received electronic processing request. The unique search identifier may be created, for example, by obtaining from the request processing system, an existing request identifier that is included in the electronic message, and associating the request identifier with an application identifier that identifies a processing application of the request processing system. The processing application may be selected based on, for example, the ability of the processing application to read electronic messages having the same format as the electronic message by which the electronic processing request was conveyed. Application identifiers may be predefined by the applications with which they are associated, or may be configurable by a user. In any case, with the unique search identifier comprised of both a request identifier and an application identifier that is based on a format of the electronic message by which the electronic processing request was conveyed, it can be ensured that the request location tool will not confuse one electronic processing request with another during the course of locating an electronic processing request within the request processing system.

Electronic processing request location operations may be performed through a user interface of the tool. Use of a real-time request location system according to examples of the present disclosure saves time, as well as processor and memory resources. Additionally, the real-time nature of the request location function may help to minimize any negative consequences of an electronic processing request that is slow or unlikely to complete. For example, the request location tool may also monitor electronic processing requests within the request processing system and may generate a notification if a processing problem occurs.

According to an example of the present disclosure, an electronic processing request may be a request to process an electronic transaction. For example, and without limitation, the electronic processing request may be a request to process a wire transfer, an ACH transaction, a SWIFT transaction, a real time payment transaction, a check clearing transaction, or an intra-bank transfer, that is conveyed by a requestor to a banking entity via an electronic message. A typical financial institution may receive numerous such transaction processing requests on a daily basis.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

Figure 1:
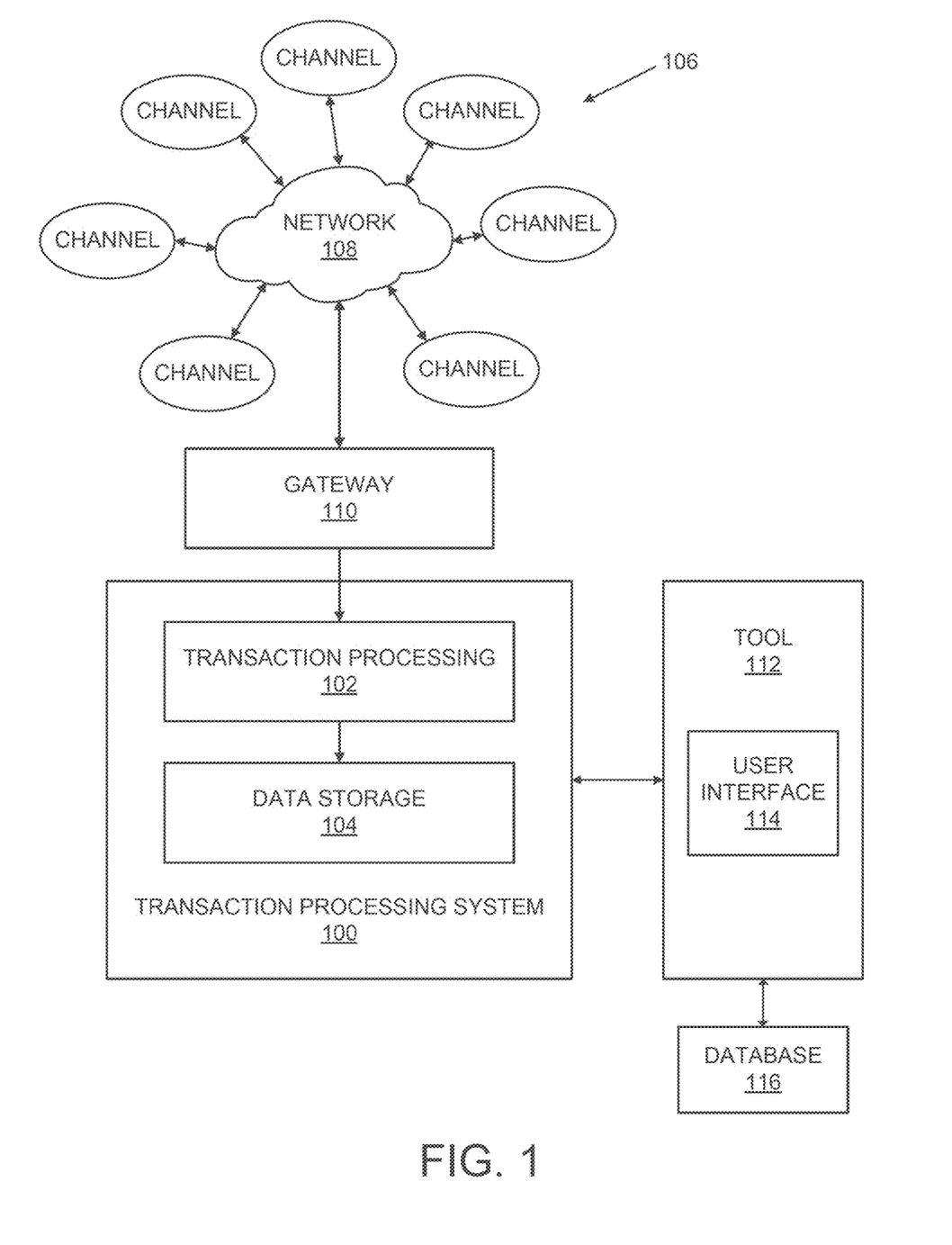
FIG. 1 is a schematic block diagram representing one example of a computing environment for executing electronic processing requests, according to an example of the present disclosure.

FIG. 1 is a schematic block diagram representing one example of a computing environment for executing electronic processing requests, according to an example of the present disclosure. In this particular example, the electronic processing requests are requests to process electronic transactions. As depicted, the computing environment includes a transaction processing system 100 associated with an entity. The transaction processing system 100 includes a transaction processing layer 102 and a data storage layer 104 in this example. Requestors can transmit electronic transaction processing requests to the transaction processing system 100 from a plurality of different initiating channels, which are collectively indicated in FIG. 1 by reference number 106 for simplicity of illustration. Although seven different initiating channels 106 are shown in FIG. 1 for purposes of illustration, a different number of initiating channels may be present in other examples. A given transaction processing system can receive electronic transaction processing requests from numerous initiating channels.

The initiating channels 106 can transmit electronic transaction processing requests to the transaction processing system 100 via a network 108 and through a transaction gateway 110. The network 118 may be without limitation, a local area network (LAN), a wide-area network (WAN) such as the Internet, an institutional network, cellular or other wireless networks, virtual networks such as an intranet or an extranet, etc.

A transaction location tool (hereinafter also "tool") 112 can be communicatively coupled to the transaction processing system 100. The tool 112 is operative to allow for the real-time location of electronic transactions within the transaction processing system 100. The tool 112 can include a user interface 114, through which users may perform desired transaction location functions. The tool 112 may also be communicatively coupled to a database 116, to which electronic transaction-related information may be stored and from which electronic transaction-related information may be extracted. Although not shown in FIG. 1, it should also be realized that the tool 112 can be communicatively coupled with an electronic display device by which a user can view the user interface 114, and to one or more input devices by which a user can interact with the user interface 114, perform transaction searches, and otherwise operate the tool 112.

Figure 2:
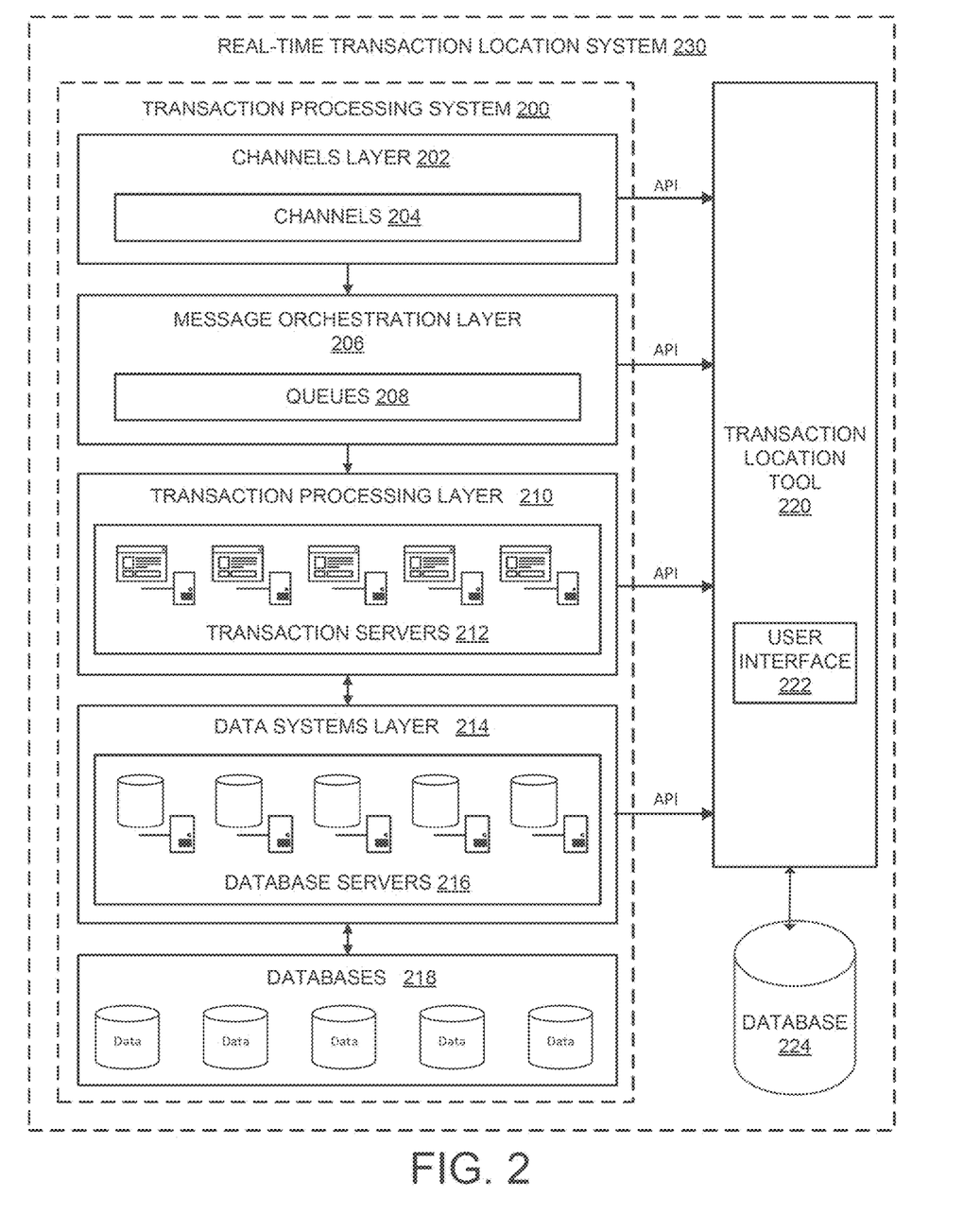
FIG. 2 is a block diagram of a request processing system within which electronic processing requests can be located in real time, according to an example of the present disclosure.

FIG. 2 is a block diagram of a real-time transaction location system 230 by which electronic transactions within a transaction processing system 200 can be located in real-time using a transaction location tool 220, according to an example of the present disclosure. The architecture of the transaction processing system 200 of FIG. 2 is provided only for purposes of illustration. Therefore, while FIG. 2 depicts the transaction processing system 200 as including certain components, other examples may involve more, fewer, or different components than are shown in FIG. 2.

As shown, the transaction processing system 200 of this example can include a channels layer 202 including a plurality of different channels that are collectively indicated by reference number 204 for simplicity of illustration. Customer and other requests to process electronic transactions may be received from a plurality of different initiating channels, such as the various initiating channels 106 of FIG. 1. According to this example, the requests can be received by corresponding channels of the plurality of different channels 204 of the channels layer 202.

Requests to process an electronic transactions are typically conveyed to the channels layer 202 via electronic messages, which can have different formats based on the type of transaction to be processed. An electronic message can include a plurality of data fields containing various electronic transaction information. For example, at least one data field of the plurality of data fields may include a transaction identifier, while other data fields of the plurality of data fields may include other electronic transaction information such as, but not limited to, the transaction amount, the transaction request date, requestor identification information, recipient identification information, requestor account information, recipient account information, a routing number, or a financial institution address.

The transaction processing system 200 may also include a message orchestration layer 206 or a similar layer. The message orchestration layer 206 of the transaction processing system 200 can receive electronic messages associated with transaction processing requests received by the channels layer 202. The message orchestration layer 206 can perform various functions related to an electronic message. Such functions may include, but are certainly not limited to, placing received electronic messages in selected ones of a plurality of individual queues, which are collectively indicated in FIG. 2 by reference number 208 for simplicity of illustration. Electronic messages may reside in the different queues 208 until called or transmitted downstream for processing.

The transaction processing system 200 can additionally include a transaction processing layer 210 for processing electronic transactions. In this example of the transaction processing system 200, the transaction processing layer 210 includes a plurality of transaction servers, which are collectively indicated by reference number 212 for simplicity of illustration. The number and location of the transaction servers 212 may vary depending on the specific design of the associated transaction processing system 200. For example, the transaction servers 212 may be arranged in a distributed server architecture, in which case at least some of the transaction servers 212 can reside in different locations, with the various transaction servers 212 communicating with other layers of the transaction processing system 200 and with each other over one or more networks.

One or more applications can operate on each of the transaction servers 212, such as but not limited to, transaction processing applications for processing different types of electronic transactions. In some examples, a given transaction server of the plurality of transaction servers 212 may be configured to run an application or multiple applications specific to processing only one type of electronic transaction (e.g., ACH transactions). In other examples, a given transaction server of the plurality of transaction servers 212 may be configured to run multiple applications that allow the given transaction server to process different types of electronic transaction (e.g., ACH transactions and SWIFT transactions). Combinations of such transaction server configurations may also be employed in some transaction processing system examples.

The transaction processing system 200 can further include a data systems layer 214. In this transaction processing system 200 example, the data systems layer 214 includes a plurality of database servers, which are collectively indicated by reference number 216 for simplicity of illustration. As with the transactions servers 212, the number and location of the database servers 216 may vary depending on the specific design of the associated transaction processing system 200. For example, the database servers 216 may be arranged in a distributed server architecture, in which case at least some of the database servers 216 can reside in different locations, with the various database servers 216 communicating with other layers of the transaction processing system 200 and with each other over one or more networks.

Each of the database servers 216 may be in communication with one or more of a plurality of databases, which are collectively indicated by reference number 218 for simplicity of illustration. The database servers 216 may retrieve transaction-related data from, or store electronic transaction-related data to, one or more of the databases 218 as needed during the processing of an electronic transaction. The database servers 216 may also communicate with one or more of the transaction servers 212 as needed during the processing of an electronic transaction.

A given electronic transaction may be processed by the transaction processing system 200 based on the electronic transaction type, which is indicated by the format of the electronic message by which the request to process the electronic transaction is conveyed to the transaction processing system 200. For example, a wire transfer may be processed by a series of applications that are all configured to receive and process wire transfers, an ACH transaction may be processed by a series of applications that are all configured to receive and process ACH transactions, etc. Other types of electronic transactions such as, for example, SWIFT transactions, real time payment transactions, check clearing transactions, and an intra-bank transfers, may be processed in a similar manner. To that end, at least the channels layer 202, the message orchestration layer 206, and the transaction processing layer 210, may each include applications that cooperate with one another to form separate processing pipelines for respectively processing the various types of electronic transactions that may be received by the transaction processing system 200.

A transaction location tool (hereinafter also "tool") 220 for enabling the real-time location of electronic transactions within the various layers 202, 206, 210 and applications of the transaction processing system 200 is also shown in FIG. 2. The tool 220 may be communicatively coupled to the transaction processing system 200. In the example shown, the tool 220 is communicatively coupled to at least the channels layer 202, the message orchestration layer 206, and the transaction processing layer 210 of the transaction processing system 200, so that the tool 220 can be used to locate an electronic transaction regardless of its position within the transaction processing system 200. As shown, the tool 220 can also be communicatively coupled to the data systems layer 214 so that the tool 212 has access to information related to a given electronic transaction. In this example, the tool 220 is communicatively coupled to each of the channels layer 202, the message orchestration layer 206, the transaction processing layer 210, and the data systems layer 214 of the transaction processing system 200 by a respective application programming interface (API) that facilitates communication between said transaction processing system layers and the tool 220.

The tool 220 can obtain from the transaction processing system 200, a format of an electronic message received by the channels layer 202. The tool 220 can also obtain from the transaction processing system 200, a transaction identifier contained in at least one of the data fields of the electronic message, as well as other electronic transaction information contained in other data fields of the plurality of data fields of the electronic message. The tool 220 can create a unique search identifier by associating the transaction identifier with an application identifier that identifies a transaction processing application operating on at least one of the multiple transaction servers 212 of the transaction processing system 200, or on a series of pipeline applications operating cooperatively across the channels layer 202, the message orchestration layer 206, and the transaction processing layer 210 of the transaction processing system 200. The transaction processing application or pipeline of transaction processing applications may be selected by the tool 220 based on the format of the electronic message.

After creating the unique search identifier, the tool 220 can assign the unique search identifier to the electronic transaction and associate the other electronic transaction information with the unique search identifier. The tool 220 can also add the unique search identifier to the electronic transaction information contained in one or more data fields of the plurality of data fields of the electronic message, or otherwise associate the unique search identifier with the electronic transaction information or with the electronic message itself. Preferably, this occurs immediately or shortly after receipt of the electronic message by the transaction processing system 200, such as while the electronic message is still located at the channels layer 202, so that the unique search identifier becomes associated with the electronic message/electronic transaction information prior to downstream travel of the electronic message and further processing of the electronic transaction. In this manner, an application or applications operating at each layer 202, 206, 210 of the transaction processing system 200 can search within received electronic messages for the unique search identifier and accurately respond to an electronic transaction location query received from the tool 220.

The tool 220 can also include a user interface 222. The user interface 222 facilitates efficient and resource-conserving real-time location of an electronic transaction using the unique search identifier assigned to the electronic transaction. For example, the user interface 222 may be configured to permit local or remote input of a search request that provides at least some of the other electronic transaction information obtained by the tool 220 from the transaction processing system 200. After inputting at least some of the other electronic transaction information, the user interface can cause the tool 220 to determine the real-time location of the electronic transaction within the transaction processing system by searching the transaction processing system using the unique search identifier associated with the electronic transaction.

In an example, the user interface 222 can also be used to perform real-time monitoring of electronic transactions during processing within the transaction processing system 200. In such an example, one or multiple electronic transactions can be simultaneously monitored in real time by locating the one or multiple electronic transactions within the transaction processing system 200, as described above, and subsequently monitoring changes in the processing status of the one or multiple electronic transactions.

In at least some examples, the user interface 222 can further provide for secure, role-based internal access to the tool 220. For example, a user may be required to log in through the user interface 222 by entering secure login credentials, and the login credentials of the user may need to be authenticated, before the user is permitted to use the tool 220.

The tool 220 may also be communicatively coupled to a database 224, which may be located remotely from the tool 220, and may be in communication with a processor of the tool 220 over a network in some examples. The database 224 may store various information related to the functionality of the tool 220. For example, the unique search identifier and the other electronic transaction information obtained by the tool 220 may be stored in the database 224. The database 224 may be a relational database, such that when the tool 220 accesses the database 224, the tool 220 can recognize various elements of the other electronic transaction information as being associated with the transaction identifier. To conserve memory resources, the unique search identifier and the other electronic transaction information stored in the database 224 relative to the electronic transaction may be automatically deleted from the database 224 once processing of the electronic transaction by the transaction processing system 200 is complete. The database 224 may also store other electronic transaction related information, such as but not limited to repeatedly updated processing status information associated with one or more electronic transactions being monitored by the tool 220.

Figure 3:
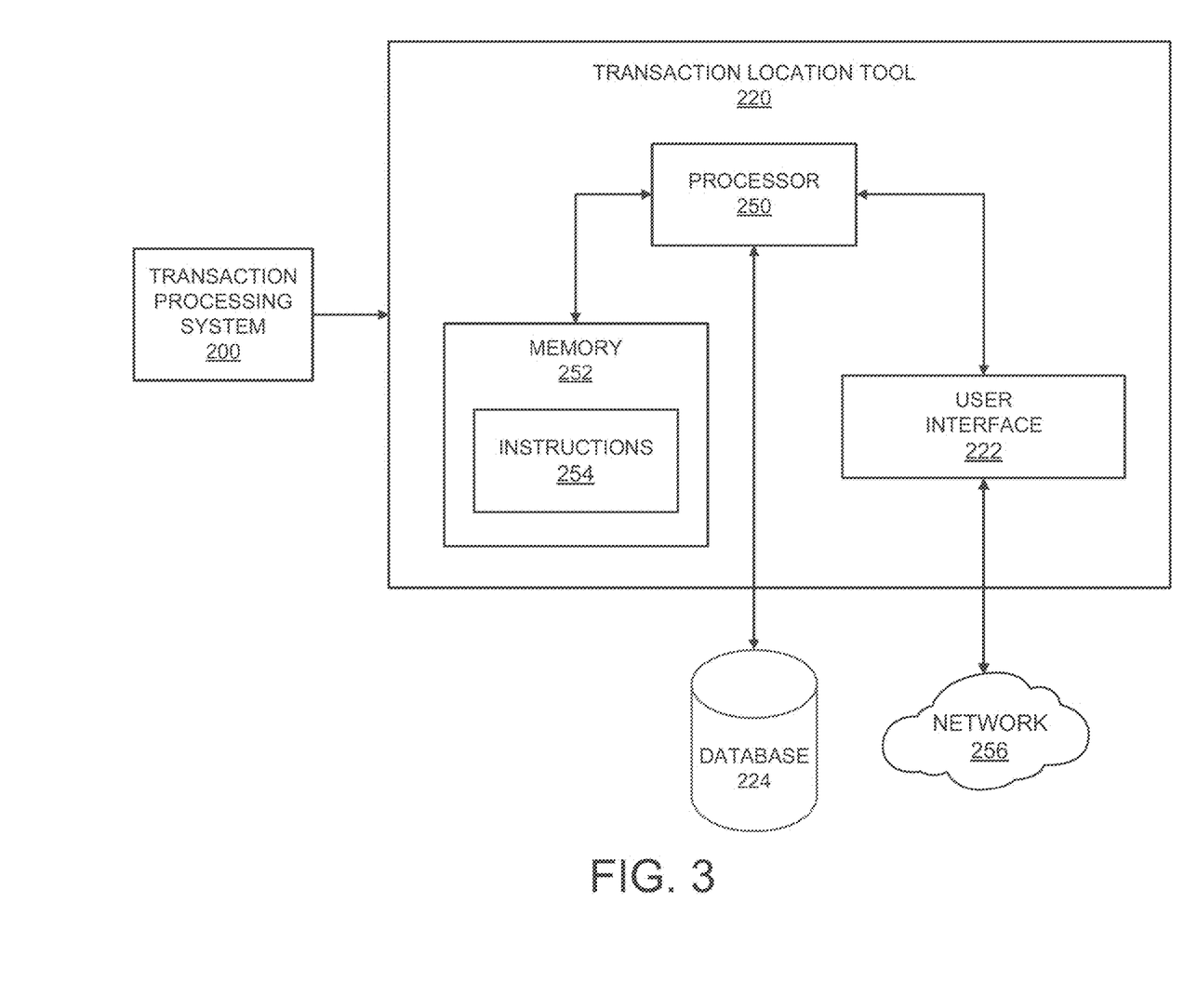
FIG. 3 is more detailed block diagram of a request location tool for effectuating the real-time location of electronic processing requests within a request processing system, according to another example of the present disclosure.

FIG. 3 is more detailed block diagram of a transaction location tool, such as the tool 220 of FIG. 2, for enabling the real-time location of transactions within a transaction processing system, such as the transaction processing system 200 of FIG. 2. As indicated in FIG. 3, the tool 220 may include a processor 250 that is communicatively coupled to a memory 252. The processor 250 can include one processing device or multiple processing devices. Non-limiting examples of the processor 250 include a Field-Programmable Gate Array (FPGA), an application-specific integrated circuit (ASIC), a microprocessor, etc. The processor 250 can execute instructions 254 stored in the memory 252 to perform operations. In some examples, the instructions 254 can include processor-specific instructions generated by a compiler or an interpreter from code written in a suitable computer-programming language, such as C, C++, C#, etc.

The memory 252 can include one memory or multiple memories. The memory 252 can be non-volatile and may include any type of memory that retains stored information when powered off. Non-limiting examples of the memory 252 include electrically erasable and programmable read-only memory (EEPROM), flash memory, or any other type of non-volatile memory. At least some of the memory 252 can be a non-transitory computer-readable medium from which the processor 250 can read the instructions 254. A computer-readable medium can include electronic, optical, magnetic, or other storage devices capable of providing the processor 250 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 250 can read the instructions 254.

The processor 250 is also shown to be communicatively coupled to the user interface 222 of the tool 220, so as to permit at least the above-described transaction locating functionality of the tool 220 to be accomplished by the processor 250. The processor 250 may also receive required user information through the user interface 222 and perform any operations necessary to authorizing a given user to use the tool 220 when the user interface 222 includes login functionality.

As represented in FIG. 3, the user interface 222 may also be communicatively coupled to a network 256. The network 256 may again be, without limitation, a local area network (LAN), a wide-area network (WAN) such as the Internet, an institutional network, cellular or other wireless networks, virtual networks such as an intranet or an extranet, etc. Communicatively coupling the user interface 222 to the network 256 as shown, can allow remote users to access and use the tool 220 through the user interface 222.

Figure 4:
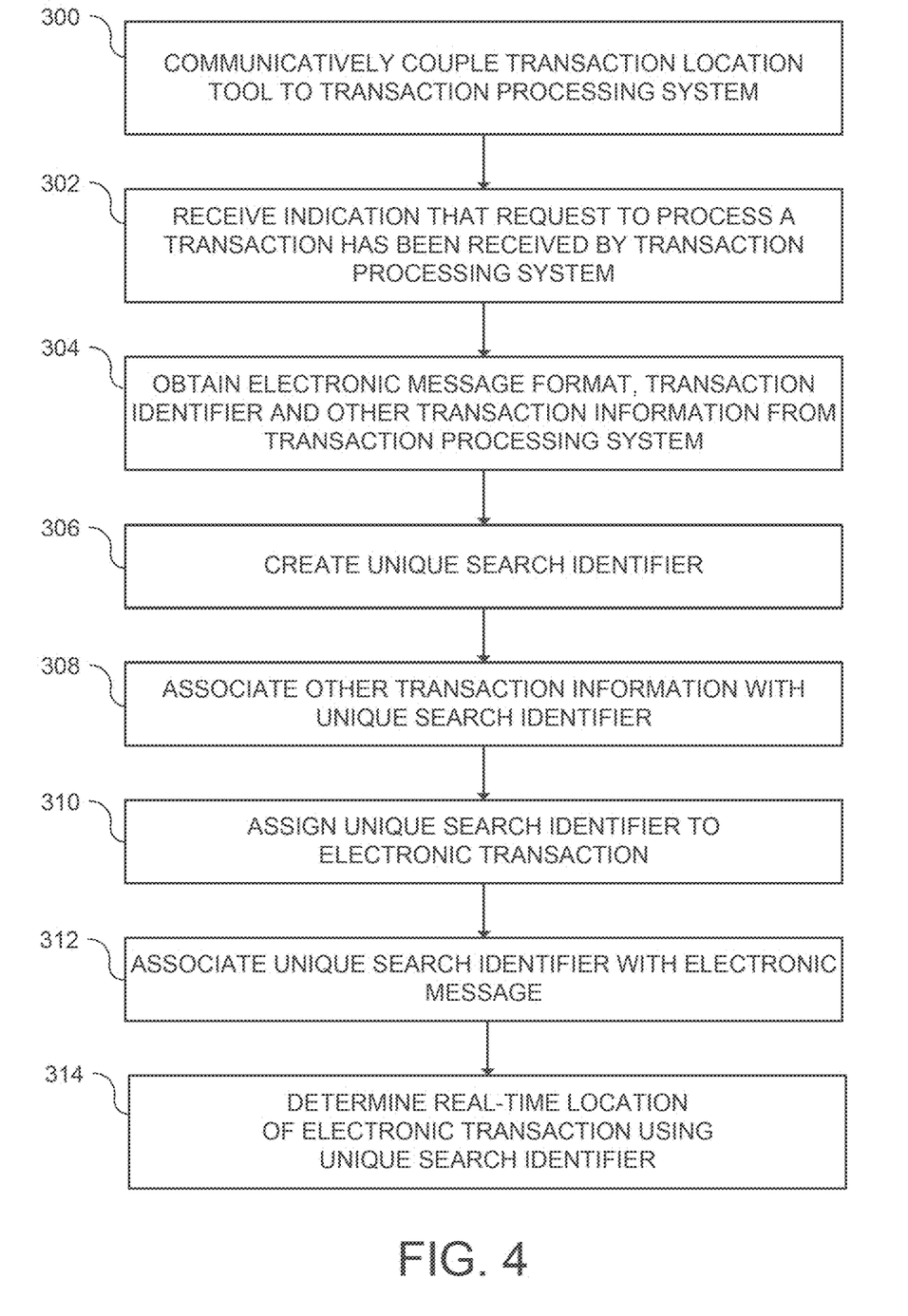
FIG. 4 is a flowchart of a computer-implemented method for the real-time location of electronic processing requests within a request processing system, according to one example of the present disclosure.

FIG. 4 is a flowchart of a computer-implemented method for the real-time location of an electronic transaction within a transaction processing system, according to one example of the present disclosure. As represented, at block 300, the method includes communicatively coupling a transaction location tool to a transaction processing system. The request processing system may include a channels layer configured to receive electronic messages transmitted via a plurality of different initiating channels, a message orchestration layer configured to receive the electronic messages from the channels layer and to queue the electronic messages for downstream transmission, and a transaction processing layer configured to receive the electronic messages from the message orchestration layer and to process, by one or more of multiple transaction servers, electronic transactions contained in the electronic messages. At block 302, a processor of the transaction location tool receives, from the transaction processing system, an indication that the transaction processing system has received from an initiating channel of the plurality of different initiating channels, an electronic message conveying a request to process an electronic transaction. The electronic message includes a plurality of data fields containing various electronic transaction information, and at least one data field of the plurality of data fields includes a transaction identifier. At block 304, the processor of the transaction location tool obtains, from the transaction processing system, a format of the electronic message, a transaction identifier associated with the electronic transaction, and other electronic transaction information contained in other data fields of a plurality of data fields of the electronic message. At block 306, the processor of the transaction location tool creates a unique search identifier by associating the transaction identifier with an application identifier that identifies a transaction processing application that is operating on at least one of the multiple transaction servers of the request processing system and is selected based on a format of the electronic message. The processor of the transaction location tool associates the other electronic transaction information with the unique search identifier at block 308, assigns the unique search identifier to the electronic transaction at block 310, and associates the unique search identifier with the electronic message at block 312. At block 314, the processor of the transaction location tool, in response to a search request providing at least some of the other electronic transaction information being input into the user interface, determines the real-time location of the electronic transaction within the transaction processing system by searching the transaction processing system using the unique search identifier.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A real-time processing request location system, comprising:
    a request processing system configured to receive electronic messages and to process electronic processing requests contained in the electronic messages; and
    a processing request location tool comprising a processor, and a memory communicatively coupled to the processor, the memory including instructions that are executable by the processor to:
        receive from the request processing system, an indication that the request processing system has received an electronic message conveying an electronic processing request, the electronic message having a plurality of data fields containing various electronic processing request information, at least one data field of the plurality of data fields including a processing request identifier;
        obtain, from the request processing system, a format of the electronic message, the processing request identifier, and one or more items of other electronic processing request information contained in other data fields of the plurality of data fields of the electronic message;
        create a unique search identifier by associating the processing request identifier with an application identifier that identifies an application executing on the request processing system;
        associate the one or more items of other electronic processing request information with the unique search identifier;
        assign the unique search identifier to the electronic processing request;
        associate the unique search identifier with the electronic message; and
        in response to receiving a search request providing at least some of the one or more items of other electronic processing request information, determine a real-time location of the electronic processing request within the request processing system by searching the request processing system using the unique search identifier.

2. The real-time processing request location system of claim 1, wherein the request processing system includes a channels layer including a plurality of different channels configured to receive electronic messages transmitted via a plurality of different initiating channels.

3. The real-time processing request location system of claim 1, wherein the instructions are executable by the processor to cause the processor to select the application based on the format of the electronic message.

4. The real-time processing request location system of claim 1, wherein the electronic processing request is a real-time electronic processing request or an electronic processing request of a plurality of received electronic processing requests that is executable as a batch.

5. The real-time processing request location system of claim 1, wherein the instructions are executable by the processor to cause the processor to associate the unique search identifier with the electronic message by writing the unique search identifier to a data field of the plurality of data fields of the electronic message.

6. The real-time processing request location system of claim 1, wherein:
    the request processing system is a transaction processing system;
    the electronic processing request is a request to process an electronic transaction;
    the processing request identifier is a transaction identifier; and
    the application is one or more transaction processing applications executing on one or more transaction servers.

7. The real-time processing request location system of claim 6, wherein the other electronic processing request information is other electronic transaction information, and the other electronic transaction information is selected from the group consisting of a transaction amount, a transaction request date, requestor identification information, recipient identification information, requestor account information, recipient account information, a routing number, a financial institution address, and combinations thereof.

8. A non-transitory computer-readable medium comprising instructions that are executable by a processor of a transaction location tool for causing the processor to:
    communicate with a transaction processing system configured to receive electronic messages and to process electronic processing requests contained in the electronic messages;
    receive from the request processing system, an indication that the request processing system has received an electronic message conveying an electronic processing request, the electronic message having a plurality of data fields containing various electronic processing request information, at least one data field of the plurality of data fields including a processing request identifier;
    obtain, from the request processing system, a format of the electronic message, the processing request identifier, and one or more items of other electronic processing request information contained in other data fields of the plurality of data fields of the electronic message;
    create a unique search identifier by associating the processing request identifier with an application identifier that identifies an application executing on the request processing system;
    associate the one or more items of other electronic processing request information with the unique search identifier;
    assign the unique search identifier to the electronic processing request;

associate the unique search identifier with the electronic message; and in response to receiving a search request providing at least some of the one or more items of other electronic processing request information, determine a real-time location of the electronic processing request within the request processing system by searching the request processing system using the unique search identifier.

9. The non-transitory computer-readable medium of claim 8, wherein the request processing system includes a channels layer including a plurality of different channels configured to receive electronic messages transmitted via a plurality of different initiating channels.

10. The non-transitory computer-readable medium of claim 8, wherein the instructions are executable by the processor to cause the processor to select the application based on the format of the electronic message.

11. The non-transitory computer-readable medium of claim 8, wherein the electronic processing request is a real-time electronic processing request or an electronic processing request of a plurality of received electronic processing requests that is executable as a batch.

12. The non-transitory computer-readable medium of claim 8, wherein the instructions are executable by the processor to further cause the processor to associate the unique search identifier with the electronic message by writing the unique search identifier to a data field of the plurality of data fields of the electronic message.

13. The non-transitory computer-readable medium of claim 8, wherein:
the request processing system is a transaction processing system;
the electronic processing request is a request to process an electronic transaction;
the processing request identifier is a transaction identifier; and
the application is one or more transaction processing applications executing on one or more transaction servers.

14. The non-transitory computer-readable medium of claim 13, wherein the other electronic processing request information is other electronic transaction information, and the other electronic transaction information is selected from the group consisting of a transaction amount, a transaction request date, requestor identification information, recipient identification information, requestor account information, recipient account information, a routing number, a financial institution address, and combinations thereof.

15. A computer-implemented method comprising:
communicatively coupling a transaction location tool to a request processing system configured to receive electronic messages and to process electronic processing requests contained in the electronic messages;
receiving, by a processor of the transaction location tool, from the request processing system, an indication that the request processing system has received an electronic message conveying an electronic processing request, the electronic message having a plurality of data fields containing various electronic processing request information, at least one data field of the plurality of data fields including a processing request identifier;
obtaining, by the processor of the transaction location tool, from the request processing system, a format of the electronic message, the processing request identifier, and one or more items of other electronic processing request information contained in other data fields of the plurality of data fields of the electronic message;
creating, by the processor of the transaction location tool, a unique search identifier by associating the processing request identifier with an application identifier that identifies an application executing on the request processing system;
associating, by the processor of the transaction location tool, the one or more items of other electronic processing request information with the unique search identifier;
assigning, by the processor of the transaction location tool, the unique search identifier to the electronic processing request;
associating, by the processor of the transaction location tool, the unique search identifier with the electronic message; and
in response to receiving a search request providing at least some of the other electronic transaction information, at the transaction location tool, determining, by the processor of the transaction location tool, a real-time location of the electronic processing request within the request processing system by searching the request processing system using the unique search identifier.

16. The computer-implemented method of claim 15, wherein the application is selected based on the format of the electronic message.

17. The computer-implemented method of claim 15, wherein the electronic processing request is a real-time electronic processing request or an electronic processing request of a plurality of received electronic processing requests that is executable as a batch.

18. The computer-implemented method of claim 15, further comprising associating, by the processor of the transaction location tool, the unique search identifier with the electronic message by writing the unique search identifier to a data field of the plurality of data fields of the electronic message.

19. The computer-implemented method of claim 15, wherein:
the request processing system is a transaction processing system;
the electronic processing request is a request to process an electronic transaction;
the processing request identifier is a transaction identifier; and
the application is one or more transaction processing applications executing on one or more transaction servers.

20. The computer-implemented method of claim 19, wherein the other electronic processing request information is other electronic transaction information, and the other electronic transaction information is selected from the group consisting of a transaction amount, a transaction request date, requestor identification information, recipient identification information, requestor account information, recipient account information, a routing number, a financial institution address, and combinations thereof.

* * * * *